(12) United States Patent
Natanzon et al.

(10) Patent No.: US 11,977,518 B2
(45) Date of Patent: May 7, 2024

(54) METHOD AND SYSTEM FOR DATA DEDUPLICATION AND COMPRESSION IN UNTRUSTED STORAGE SYSTEM

(71) Applicant: Huawei Technologies Co., Ltd., Shenzhen (CN)

(72) Inventors: Assaf Natanzon, Hod Hasharon (IL); Yehonatan David, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

(21) Appl. No.: 17/573,376

(22) Filed: Jan. 11, 2022

(65) Prior Publication Data
US 2022/0138159 A1 May 5, 2022

Related U.S. Application Data

(63) Continuation of application No. PCT/EP2020/073917, filed on Aug. 27, 2020.

(51) Int. Cl.
*G06F 16/174* (2019.01)

(52) U.S. Cl.
CPC ...... *G06F 16/1748* (2019.01); *G06F 16/1744* (2019.01)

(58) Field of Classification Search
CPC ............... G06F 16/1748; G06F 3/0641; G06F 16/1744; G06F 11/1453

USPC .......................................... 707/664, 692, 693
See application file for complete search history.

(56) References Cited

U.S. PATENT DOCUMENTS

| | | | |
|---|---|---|---|
| 6,760,845 B1 | 7/2004 | Cafarelli et al. | |
| 2003/0140227 A1* | 7/2003 | Asano | H04L 9/0836 713/157 |
| 2012/0204024 A1* | 8/2012 | Augenstein | G06F 11/1453 713/150 |
| 2014/0189348 A1* | 7/2014 | El-Shimi | H04L 63/0428 713/165 |
| 2019/0065788 A1 | 2/2019 | Vijayasankar et al. | |
| 2019/0208417 A1* | 7/2019 | Kang | H04W 12/35 |
| 2021/0318993 A1* | 10/2021 | Biondo Junior | H04L 9/0894 |

OTHER PUBLICATIONS

"End-to-End Data Encryption with Data Reduction from Thales and Pure Storage," Pure Storage, total 7 pages (Mar. 12, 2019).

* cited by examiner

*Primary Examiner* — Phong H Nguyen
(74) *Attorney, Agent, or Firm* — Leydig, Voit & Mayer, Ltd.

(57) ABSTRACT

A method for data deduplication and compression in untrusted storage system is provided for storing large amount of data more efficiently and in a secure manner and by maintaining the integrity of the data. Such data deduplication and compression in untrusted storage system is achieved by utilizing by a system comprising a set of trusted servers, which are configured to trust each other and to share common encryption keys.

6 Claims, 5 Drawing Sheets

METHOD AND SYSTEM FOR DATA DEDUPLICATION AND COMPRESSION IN UNTRUSTED STORAGE SYSTEM

CROSS-REFERENCE TO RELATED APPLICATIONS

This application is a continuation of International Application No. PCT/EP2020/073917, filed on Aug. 27, 2020, the disclosure of which is hereby incorporated by reference in its entirety.

TECHNICAL FIELD

Embodiments of the present disclosure relate generally to the field of data protection and backup; and more specifically, to methods and systems for data deduplication and compression in untrusted storage systems.

BACKGROUND

Typically, data backup is used to protect and recover data in an event of data loss in a primary storage system (e.g. a server). Examples of the event of data loss may include, but is not limited to, data corruption, hardware or software failure in the primary storage system, accidental deletion of data, hacking, or malicious attack. Thus, for safety reasons, a separate backup system or a storage system is extensively used to store a backup of the data present in the primary storage system. Typically, with time, the storage space of the storage system becomes occupied as changes in data or any new data occupy large storage space in the conventional storage systems. This is undesirable as it causes a reduction in the performance of the storage systems. Moreover, the cost of data storage, with all the associated costs including the cost of storage hardware, continues to be a burden.

Generally, in many cases like in a cloud environment, the storage may not be trusted (i.e. an untrusted storage). In such cases, data that is written to the untrusted storage is encrypted. In other words, in the case of untrusted storage, there may be a potential risk of data compromise, if data is stored without encryption. For example, any third party or untrusted entities may also be able to read the stored data in the untrusted storage (e.g. in a cloud environment), and thus the data stored in such untrusted storage is encrypted to mitigate the compromise in data security. However, if the stored data is in encrypted form, this means that the data cannot be further compressed, and the use of encryption keys becomes a bottleneck, which in turn limits the amount of data reduction in such conventional storage systems (e.g. the untrusted storage or the backup system). Moreover, in such conventional systems, there are issues with data deduplication as encrypted data can be de-duplicated only if the same encryption key is used. Furthermore, sometimes encrypted data requires re-keying, and in such cases deduplication stops working, which in turn adversely impacts data protection, recovery, as well as data reduction.

Currently, there are many techniques that may be employed for data reduction, for example, fixed size data deduplication. In the fixed size data deduplication, a given storage is divided into fixed size aligned blocks for example of size 8 KB or 16 KB. Further, for each block a strong hash signature is calculated. If a block that is to be written to the storage has the same hash signature as an already-written block, the block is considered identical and thereby only a pointer (or a reference) to the block is used. If the block is not identical, the data of the block is compressed before writing to the storage. Such conventional techniques are inefficient and usually involve reducing the amount of data to be stored by eliminating redundant data. Thus, there is no substantial reduction in the amount of data to be stored in the conventional storages. Moreover, some storage systems allow trust between the backup storage and the servers (or clients) by letting the backup storage get the encryption keys of the server (or clients) and thus the backup storage can decrypt, compress, and deduplicate the data and further can re-encrypt the data during reading of the data. However, conventional techniques do not allow any compression of deduplicated data unless there is trust between the backup storage and the servers writing to the backup storage. Thus, deduplication ratios and compression ratios are much lower on encrypted data in conventional technologies. Thus, it is still a technical problem of how to reduce data in a storage system that is not trusted.

Therefore, in light of the foregoing discussion, there exists a need to overcome the aforementioned drawbacks associated with conventional data storage which do not allow any deduplication of data without mutual trust between servers and storage.

SUMMARY

The present disclosure seeks to provide a method and system for a data deduplication and compression in an untrusted storage system. The present disclosure seeks to provide a solution to the existing problem of inefficient data storage that is how to further reduce data in a storage that is not trusted as compared to conventional methods and systems. An aim of the present disclosure is to provide a solution that overcomes at least partially the problems encountered in prior art and provide improved methods and systems that allow effective data deduplication and compression even in the untrusted storage system, which results in an efficient data storage (i.e. significantly reduces data stored in untrusted storage, for example, in the cloud environment).

The object of the present disclosure is achieved by the solutions provided in the enclosed independent claims. Advantageous implementations of the present disclosure are further defined in the dependent claims.

In one aspect, the present disclosure provides a method for a data deduplication and compression in an untrusted storage system, the method comprises: defining a first set of trusted servers, wherein each trusted server of the first set of trusted servers is configured to use a first encryption key and a first hash function; separating the data in the trusted servers into blocks having fixed aligned sizes according to a block size of the data in the untrusted storage system for compression; calculating a first hash value of the data; compressing the data of each block on the server of the first set of trusted servers; encrypting the compressed data by using the first encryption key; executing a write function via an application program interface, API, by sending a key ID of the first encryption key and the first hash value from the one or more trusted servers of the first set of trusted servers to a storage array of the untrusted storage system; executing a read function via the API by decrypting by the server the data of each block with a key matching the key ID of the first encryption key and decompressing the data.

The method of the present disclosure enables efficient compression and encryption of the data to be stored in the untrusted storage, from one or more servers of the first set of trusted servers. Further, the key ID and hash value of the data (before compression and encryption) along with the compressed and encrypted data is stored in the untrusted storage and the encryption keys are stored with the first set of trusted servers. As a result, when a new data is to be stored in the untrusted storage, the hash value of the new data is compared with the hash value of already stored data to check if the new data is already present in the untrusted storage. Thus, data deduplication is implemented between the first set of trusted servers and the untrusted storage without the need to have mutual trust between the first set of trusted servers and the untrusted storage in comparison to conventional technologies where such deduplication of the compressed and encrypted data is not possible without the mutual trust. Moreover, storing of compressed and encrypted data in the untrusted storage enables storing a larger amount of data in a secure manner, which is significantly cost-effective in comparison to conventional technologies. The method of the present disclosure thereby provides a new protocol that allows doing the compression of data on the host (e.g. one or more servers of the first set of trusted servers), while allowing the untrusted storage to have de-duplication and storing of the data compressed, thus allowing data reduction even when storage is not trusted.

In an implementation form, executing the read function further comprises verifying that the decompressed data has a correct hash value. By virtue of verifying that the decompressed data has the correct hash value enable in maintaining the integrity of the data, which in turn maintains accuracy during recovery when required.

In a further implementation form, executing the write function further comprises using the hash value and the key ID at the storage array for identifying whether the same hash value already exists in the storage array for the first set of trusted servers. By virtue of the identification of whether the same hash value already exists in the storage array, deduplication of data is implemented by the present disclosure. Data deduplication is implemented by comparing the hash values without directly comparing the data.

In a further implementation form, executing the write function at the storage array further comprises identifying whether the key ID of the first encryption key has changed. By virtue of the identification of whether the key ID of the first encryption key has changed, the key IDs stored in the untrusted storage can be updated based on the change in encryption key stored in the first set of trusted servers.

In a further implementation form if the key ID of the encryption key has not changed the method further comprises storing from the write function, by the untrusted storage, the pointer to the location of the data. By virtue of storing the pointer to the location of the data, new data that is the same as already stored data is not stored. In other words, if the key ID does not change, the new data will just point to the old data. Thus, the method of the present disclosure has an improved storage capacity in comparison to conventional technologies.

In a further implementation form if the key ID of the encryption has changed the method further comprises replacing at the storage array the data encrypted with the first encryption key with the data encrypted with the changed encryption key and updating a data of a key ID of the changed encryption key. By virtue of the replacing the data encrypted with the first encryption key with the data encrypted with the changed encryption key, an effective data deduplication and compression is ensured in the untrusted storage system even when the key ID of the encryption is changed, which results in an efficient data storage (i.e. significantly reduces data stored in untrusted storage, for example, in the cloud environment. Thus, in other words, the API is leveraged to achieve compression and deduplication for the untrusted storage, even when the key ID of the data is replaced.

In another aspect, the present disclosure provides a system for a data deduplication and compression in an untrusted storage system, the system comprises an untrusted storage comprising fixed size aligned blocks; trusted servers using an encryption key, wherein the trusted servers are grouped to one or more sets of trusted servers based on the encryption key; an application program interface for executing a write function and a read function between the trusted servers and the untrusted storage, and wherein one or more trusted servers of the set of trusted servers is configured to perform the data deduplication and compression to the untrusted storage system.

The system of the present disclosure provides efficient data storage (i.e. significantly reduces data stored in the untrusted storage, for example, in the cloud environment). The system allows an effective data deduplication and compression in the untrusted storage, resulting in improved data storage capacity of the untrusted storage. The application program interface (API) for executing the write function and the read function between the trusted servers and the untrusted storage is leveraged to achieve compression and deduplication for the untrusted storage.

In yet another aspect, the present disclosure provides a computer readable media comprising computer readable instructions for implementing an application programming interface for data deduplication and compression in an untrusted storage system according to the method of the previous aspect. The computer readable media of the present disclosure enables in deduplication and compression of data that is stored in the untrusted storage without the need of any mutual trust between trusted servers (that transmit the data) and the untrusted storage (that stores the data backup) in comparison to conventional technologies where deduplication is possible only upon mutual trust.

It is to be appreciated that all the aforementioned implementation forms can be combined. It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. To illustrate the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
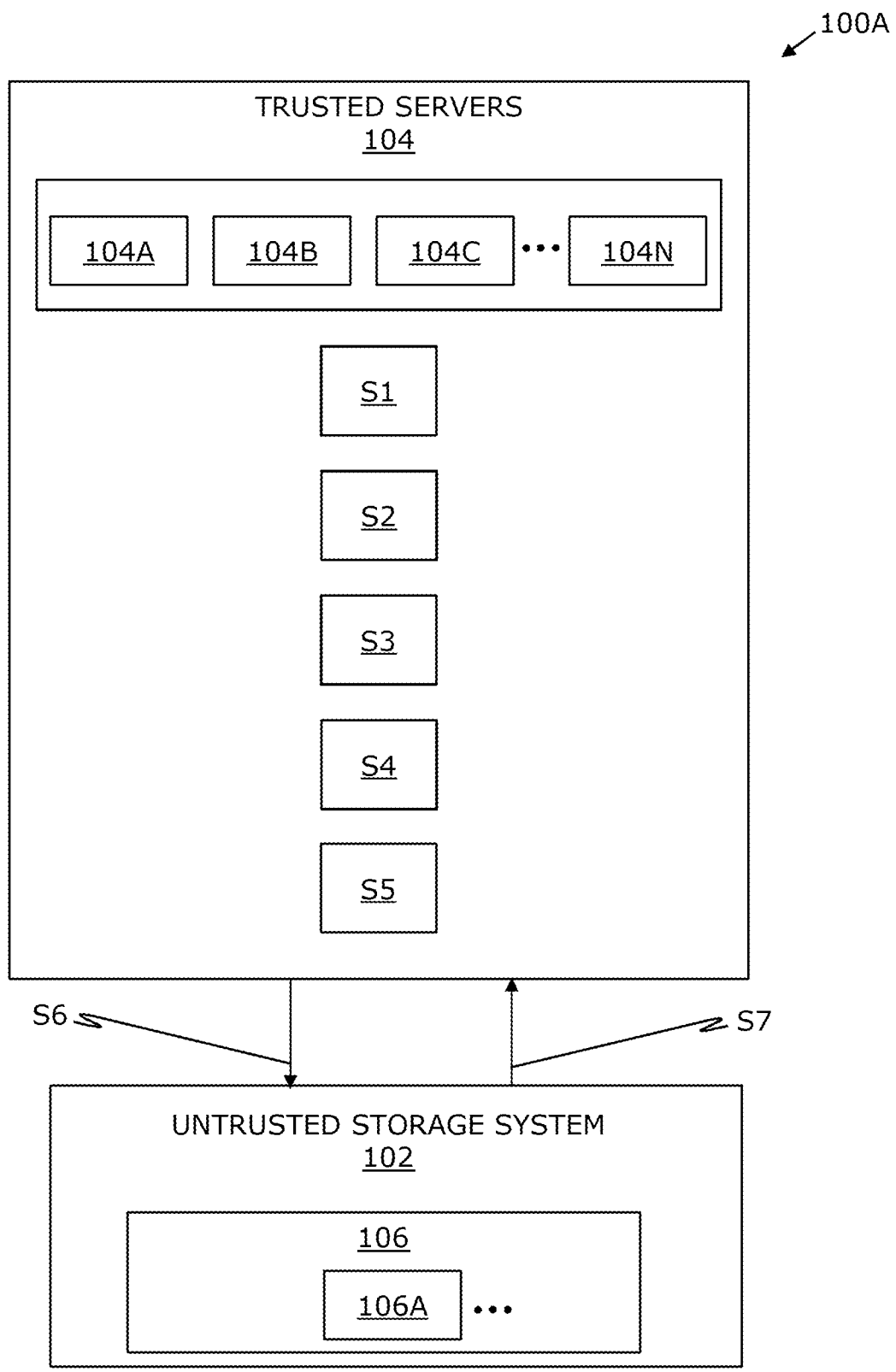
FIG. 1A is a flowchart of a method for data deduplication and compression in an untrusted storage system, in accordance with an embodiment of the present disclosure.

FIG. 1A is a flowchart of a method for data deduplication and compression in an untrusted storage system, in accordance with an embodiment of the present disclosure. In one aspect, the present disclosure provides a method 100A for data deduplication and compression in an untrusted storage system, the method 100A comprises:

defining a first set of trusted servers, wherein each trusted server of the first set of trusted servers is configured to use a first encryption key and a first hash function;

separating the data in the trusted servers into blocks having fixed aligned sizes according to a block size of the data in the untrusted storage system for compression;

calculating a first hash value of the data;

compressing the data of each block on the server of the first set of trusted servers;

encrypting the compressed data by using the first encryption key;

executing a write function via an application program interface, API, by sending a key ID of the first encryption key and the first hash value from the one or more trusted servers of the first set of trusted servers to a storage array of the untrusted storage system;

executing a read function via the API by decrypting by the server the data of each block with a key matching the key ID of the first encryption key and decompressing the data.

The method 100A includes steps S1, S2, S3, S4, S5, S6 and S7. The steps S1 to S7 may be executed in any reasonable order to carry into effect the objectives of the disclosed embodiments. No particular order to the disclosed steps of the method 100A is necessarily implied by the depiction in FIG. 1A, and the accompanying description, except where a particular method step is a necessary precondition to execution of any other method step. Individual method steps may be carried out in sequence or parallel in simultaneous or near simultaneous timing. With reference to FIG. 1A, there is further shown an untrusted storage system 102 and trusted servers 104 (which are described in detail, for example, in FIG. 1B). The untrusted storage system 102 includes a storage array 106 having one or more untrusted storages, such as an untrusted storage 106A (for data backup). The trusted servers 104 includes one or more host servers, such as the servers 104A-104N.

At step S1, the method 100A comprises defining a first set of trusted servers, wherein each trusted server of the first set of trusted servers is configured to use a first encryption key and a first hash function. Generally, trusted servers 104 are the servers that are trusted for data safety. Specifically, the trusted servers 104 are servers that can communicate with each other to share the same encryption keys or have a key manager for sharing the same keys for encryption. The first set of trusted servers refers to at least one host group of servers (e.g. the servers 104A and 104B) that trust each other. The first set of trusted servers is defined so that deduplication can be executed exclusively for the first set of trusted servers (i.e. servers within one host group, so the data of one host group will not be overwritten by another host group during backup. Moreover, one host group may share the same encryption keys (e.g. the first encryption key) and the same hash function (e.g. the first hash function). In an example, the first set of trusted servers includes a group of host servers of a given organization, a team or department within an organization, or any entity. In another example, a first set of trusted servers includes servers of different participating entities which trust each other with data that is shared and stored in the untrusted storage system 102. The first set of trusted servers is potentially defined by one of the trusted servers 104, which may act as a management server or based on a user input, for example, user-configurations or settings. Each trusted server is configured to use the first encryption key for encrypting the data using an encryption algorithm and use the first hash function for hashing the data.

According to an embodiment, the method 100A may further include one or more other sets of trusted servers, such as a second set of trusted servers, a third set of trusted servers, and the like wherein each trusted server of a respective set of server trusts only the servers in the respective set or group. The first hash function is agreed by the first set of trusted servers so that each set of trusted servers have a different hash function to avoid collisions. Upon hashing and encrypting, a given trusted server sends to the untrusted storage system 102, a compressed encrypted data along with a hash of the data before the encryption.

According to an embodiment, the encryption keys used by the first set of trusted servers is potentially stored in a key manager. In an example, the key manager may include an indexed form of the encryption keys used by the respective set of the different sets of trusted servers. Moreover, the key manager may include a key generation algorithm to generate the encryption keys for use by the first set of trusted servers. According to an embodiment, each trusted server of the first set of trusted servers can communicate to other trusted servers to share the encryption keys. If the same encryption keys are used, and the same hash function is used then do not need any communication, and just a defined protocol may be used.

At step S2, the method 100A further comprises separating the data in the trusted servers 104 into blocks having fixed aligned sizes according to a block size of the data in the untrusted storage system 102 for compression. In other words, the trusted servers 104, when trying to write data to the untrusted storage system 102, will separate (i.e. create chunks of) the data into fixed size aligned blocks according to a storage block size for compression. The data is stored in the form of blocks of data in the untrusted storage system 102. The block size herein refers to the amount of data (for example in Kilobytes) that a block can store. The data is separated at a given trusted server (e.g. server 104A) into blocks having fixed aligned size to enable improved storing and efficient retrieval of data from the untrusted storage system 102. Beneficially, the separating of the data into blocks also enables improved indexing of the data in the untrusted storage system 102. As a result of separating of the data into blocks, at the time of writing of data to the untrusted storage system 102, the writes are aligned to the size to the compressed blocks of the untrusted storage system 102 and thereby the size of each write will be a multiple of the untrusted storage system's compressed block. In an example, the separating of the data may be based on a type of data (e.g. from the same file or file type) or metadata associated with data. In another example, the separating of the data may be performed based on a time of the creation of data, a user defined time for backup of the data, an importance of the data, an alphabetic order of the data, and the like.

The untrusted storage system 102 is a block-based storage. In an example, a basic block size is 8 Kilobytes, that means all inputs and outputs of the data to each untrusted storage of the untrusted storage system 102 must be aligned to 8 Kilobytes offset and of size which is a multiple of 8 Kilobytes (i.e. 24 Kilobytes, 40 Kilobytes, 128 Kilobytes and the like). Size of write (before compression) must be multiple of 8 Kilobytes (i.e. according to the storage block size) for example writing 8 Kilobytes, 16 Kilobytes, 24 Kilobytes, 64 Kilobytes, but not writing 4 Kilobytes. In an example, if 4 Kilobytes of data is to be written to offset 18 Kilobytes, then there is a need to first read from offset 16 Kilobytes, an amount of 16 Kilobytes, replace the 4 Kilobytes from offset 18 Kilobytes till 22 Kilobytes with the new data, and then write again the 16 Kilobytes to offset 16 Kilobytes.

In an example, the untrusted storage system 102 comprises at least one untrusted storage, such as the untrusted storage 106A, which is configured to store the data received from the first set of trusted servers. In another example, the untrusted storage system 102 comprise the storage array 106, which includes one or more untrusted storages, such as the untrusted storage 106A, which are configured to store the data received from the first set of trusted servers.

At step S3, the method 100A further comprises calculating a first hash value of the data. The first hash value of the data is calculated at one trusted server of the first set of trusted servers by using the first hashing function. In an example, the first hash value of each block of data on the trusted server is calculated. The hash value refers to fixed sized values of data having arbitrary sizes generated using hash functions or hashing algorithms. In other words, hash values refer to fixed sized values that represent original data having arbitrary sizes. In an example, the hash value may be a hexadecimal string of several characters representing the data. Examples of the hashing function include but are not limited to SHA-1, SHA-2, MD5, CRC32. Beneficially, hash values enable comparison between two blocks of data without actually comparing between the data of the two blocks of data. The first hash value refers to the hash value generated for a given data block by the trusted server. The first hash value further enables in the identification and prevention of the storage of duplicate data blocks by the trusted server.

At step S4, the method 100A further comprises compressing the data of each block on the server of the first set of trusted servers. The data of each block on the server (e.g. the server 104A, which is one of the trusted servers 104) is compressed to reduce a storage space occupied by the data when stored in the untrusted storage system 102. As a result, the untrusted storage system 102 can store a larger amount of data in comparison to storing uncompressed data. In an example, the first set of trusted servers uses a compression algorithm for compressing the data. Examples of compression algorithms include, but are not limited to LZ77, DEFLATE, LZR, CNN (Convolutional Neural Network) based compression, GAN (Generative Adversarial Network) based compression. According to an embodiment, each block of the data is compressed to a level that during decompression of the data, the authenticity of the data is maintained.

At step S5, the method 100A further comprises encrypting the compressed data by using the first encryption key. The compressed data is encrypted using an encryption algorithm by at least one trusted server (e.g. the server 104A) of the first set of trusted servers. The compressed data is encrypted to prevent undesired access of the compressed data by any unauthorized users, servers, or third party entities (e.g. in a cloud environment). For example, the data may contain confidential information associated with for example the first set of trusted servers. The encryption of the compressed data prevents the information theft of such confidential information by unauthorised users. The first encryption key is a unique encryption key that is used specifically for a respective block of data. As a result, the data may be accessed only using the first encryption key. Examples of encryption algorithms include but are not limited to Twofish, MD5, Advanced Encryption Standard (AES), International Data Encryption Algorithm (IDEA) and the like.

At step S6, the method 100A further comprises executing a write function via an application program interface (API) 108, by sending a key ID of the first encryption key and the first hash value from the one or more trusted servers of the first set of trusted servers to the storage array 106 of the untrusted storage system 102. The key ID (i.e. key identifier) refers to a unique identifier of a given encryption key. In an example, the key ID is used for associating the first encryption key stored in the first set of trusted servers with the compressed data stored in the untrusted storage system 102.

The first hash value is the hash value of the data that is generated before encryption of the data at one of the trusted servers of the first set of trusted servers. The storage array 106 of the untrusted storage system 102 is an array where data is stored in an encrypted form to mitigate any potential data compromise. In an example, the untrusted storage system 102 may be a cloud storage. The set of trusted servers trust each other, but do not trust the untrusted storage system 102. As a result, the first set of servers stores the compressed and encrypted data in the untrusted storage system 102 along with the key ID of the encryption key and the encryption keys are stored with the first set of trusted servers.

In an example, a write function is represented by function (1) that is shown below.

$$\text{Write(offset,size,vector(compressed\_data,compressed\_size,hash of data before compression, keyID of encryption))} \quad (1),$$

wherein,

'offset' refers to offset in the untrusted storage system 102. The offset may be a multiple of the size of the compressed block. For example, if a trusted server (e.g. the server 104A) compresses data in chunks of 8 Kilobytes, the write will be to offset which is a multiple of 8 Kilobytes;

'size' refers to a number of blocks to be written (without compression). The number of blocks is also multiple of the compressed block size, for example, a multiple of 8 Kilobytes;

'vector(compressed_data, compressed_size, hash of data before compression, keyID of encryption))' refers to the vector with compressed data elements, the size of the vector is the number of compressed data elements. For example, if the compressed block is 8 Kilobytes and the size is 64 Kilobytes, the number of elements in the vector is 8 (i.e. 64/8=8);

'compressed_data' refers to the data of a single compressed block;

'compressed_size' refers to the size in bytes of the compressed data;

'hash of data before compression' refers to a hash, for example, SHA2 of the data before the compression and encryption was applied (the hash value may also be encrypted with the same key as the compressed data);

'keyID of encryption' refers to an identification of the encryption key that was used to encrypt the data after the data was compressed.

At step S7, the method 100A further comprises executing a read function via the API 108 by decrypting by the server (e.g. the server 104A) the data of each block with a key matching the key ID of the first encryption key and decompressing the data. As the data is compressed and encrypted using the first encryption key, the decryption of the data during execution of the read function requires matching the key ID of the first encryption key to enable decryption of data using the first encryption key. As a result, any unauthorized server cannot access the data without having the correct first encryption key. Beneficially, this makes the method 100A secure from data theft while also ensuring storage of data is in compressed form without the need of any mutual trust between the first set of servers and the untrusted storage system 102. The method 100A of the present disclosure provides a new protocol that allows doing the compression of data on the first set of trusted server, while allowing the untrusted storage system 102 to have de-duplication and storing of the data in a compressed form, thus allowing data reduction even when storage is not trusted.

According to an embodiment, executing the read function further comprises verifying that the decompressed data has a correct hash value. When data is read upon execution of the read function, the server (e.g. the server 104A) of the first set of trusted servers will decrypt each block of data with the key matching the key ID, then the server will decompress the data, and verify that the decompressed data indeed has the correct hash value, this allows the integrity of the data, which in turn help maintain accuracy during recovery when required.

In an example, the read function that is executed is represented by the function (2) stated below.

$$\text{vector(compressed\_data,compressed\_size,hash of data before compression,keyID of encryption)} = \text{Read(offset,size)} \quad (2)$$

The parameters 'compressed_data', 'compressed_size', 'hash of data before compression', 'keyID of encryption' of the read function in function (2) are the same as for the write function except the vector now is the output and not the input.

According to an embodiment, executing the write function further comprises using the hash value and the key ID at the storage array 106 for identifying whether the same hash value already exists in the storage array 106 for the first set of trusted servers. During the execution of the write function, the hash value and the key ID received from one of the first set of trusted servers is compared with the hash values and key IDs already stored in the storage array 106 of the untrusted storage system 102. If based on the comparison the hash value and the key IDs already exist in the storage array 106 of the untrusted storage system 102, then the data is not stored again in the untrusted storage system 102. As a result, deduplication of data is executed by the method 100A of the present disclosure such that same (or similar) data is not stored again in the untrusted storage system 102 based on the hash values and key ID of data stored in the storage array 106. If based on the comparison the hash value and the key IDs do not exist in the storage array, then the data is stored in the untrusted storage system 102. In other words, if the hash value does not exist, the untrusted storage system 102 creates a new entry, and stores the compressed encrypted data with the hash value as an index for accessing the data. The identification of whether the hash value and the key ID received via the write function is already existing in the storage array 106 is done in the storage array 105 of the untrusted storage system 102 when the write function arrives from the first set of trusted servers. In an example, the SHA-2 hash value of the data already stored in the untrusted storage system 102 is compared with the SHA-2 hash value of the data received from one of the first set of trusted servers.

Beneficially, the method 100A enables deduplication for the data that is stored as compressed data without the need of any mutual trust between the first set of servers and the untrusted storage system 102 in comparison to conventional technologies where deduplication is only possible for compressed data when there is mutual trust between the servers and a storage system.

According to an embodiment, executing the write function at the storage array 106 further comprises identifying whether the key ID of the first encryption key has changed. The key ID of the first encryption key is checked for a change upon determining that the first hash value received by the write function already exists in the untrusted storage system 102. If the hash value does not exist, the untrusted storage system 102 creates a new entry, and stores the compressed encrypted data with the hash value as an index for accessing the data. The key ID of the first encryption key may regularly be changed to improve security associated with the encryption keys stored in the first set of trusted servers. In an example, the key ID may be changed by the server or usually through the key manager notifying the servers of the change. In an example, a user or a key manager may notify of a key ID change.

According to an embodiment, if the key ID of the encryption key has not changed the method 100A further comprises storing from the write function, by the untrusted storage, the pointer to the location of the data. In other words, if the first hash value is already present in the storage array, the untrusted storage system 102 checks if the encryption key of the encryption did not change from last time. If the key ID of the encryption key did not change (i.e. encryption key did not change), the new data (i.e. the data received from the first set of trusted servers) will just point to the old data (i.e. the data that is already stored in the untrusted storage system 102) via the pointer. In an example, the storage will just store the pointer from the new offset to the location of the data.

According to an embodiment, if the key ID of the encryption has changed the method 100A further comprises replacing at the storage array the data encrypted with the first encryption key with the data encrypted with the changed encryption key and updating a data of a key ID of the changed encryption key. In other words, if the first hash value exists but the key ID was updated, the untrusted storage system 102 will update the data and the encryption key, and all the previous entries (i.e. already stored data having first hash value) will point to the data encrypted with the new encryption key. The pointers to this data are based on the hash value and thus remain the same. In an example, if the key ID changed, the untrusted storage 106A may also change previously stored data and the key ID and store new values instead of last values. As a result, this allows the method 100A to change the storage keys and still keep the deduplication, the data will just need to be written using the new key ID. This key ID change process provides a signal to all the servers of the first set of servers to start using the new key ID. After all storages have the new key ID, a background process can start re-encrypting all the data with the new key. In an example, the servers may use the old key ID while the data is re-keyed.

In an exemplary implementation, the first set of trusted server sends to the untrusted storage system 102, the compressed encrypted data along with the hash of the data before the encryption. Subsequent steps happen at the side of the untrusted storage system 102. The untrusted storage system checks if the hash value already exists. If the hash value does not exist in the storage array, the untrusted storage system 102 creates a new entry, and stores the compressed encrypted data with the hash value as an index for accessing the data. Further, the key ID of the encrypted data is also stored. If the hash value exists in the storage array 106, the untrusted storage system 102 checks if the encryption key of the encryption did not change from last time. If the key ID did not change, the new data will just point to the old data that is already stored in the untrusted storage system. If the hash exists but the key ID was updated, the untrusted storage system will update the data and the encryption key, and all the previous entries (i.e. already stored data) will point to the data encrypted with the new encryption key.

The steps S1 to S7 are only illustrative and other alternatives can also be provided where one or more steps are added, one or more steps are removed, or one or more steps are provided in a different sequence without departing from the scope of the claims herein.

In another aspect provided is a computer readable media comprising computer readable instructions for implementing an application programming interface for data deduplication and compression in an untrusted storage system according to the method 100A. The computer readable storage medium for providing a non-transient memory may include, but is not limited to, an electronic storage device, a magnetic storage device, an optical storage device, an electromagnetic storage device, a semiconductor storage device, or any suitable combination of the foregoing. In yet another aspect, the present disclosure provides a computer program adapted to perform the method 100A by a device (e.g. one of the trusted servers 104 or the untrusted storage 106A). In another aspect, the present disclosure provides a computer program product comprising a non-transitory computer-readable storage medium having computer-readable instructions being executable by a processor to execute the method 100A. Examples of implementation of the non-transitory computer-readable storage medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, or CPU cache memory.

Figure 1B:
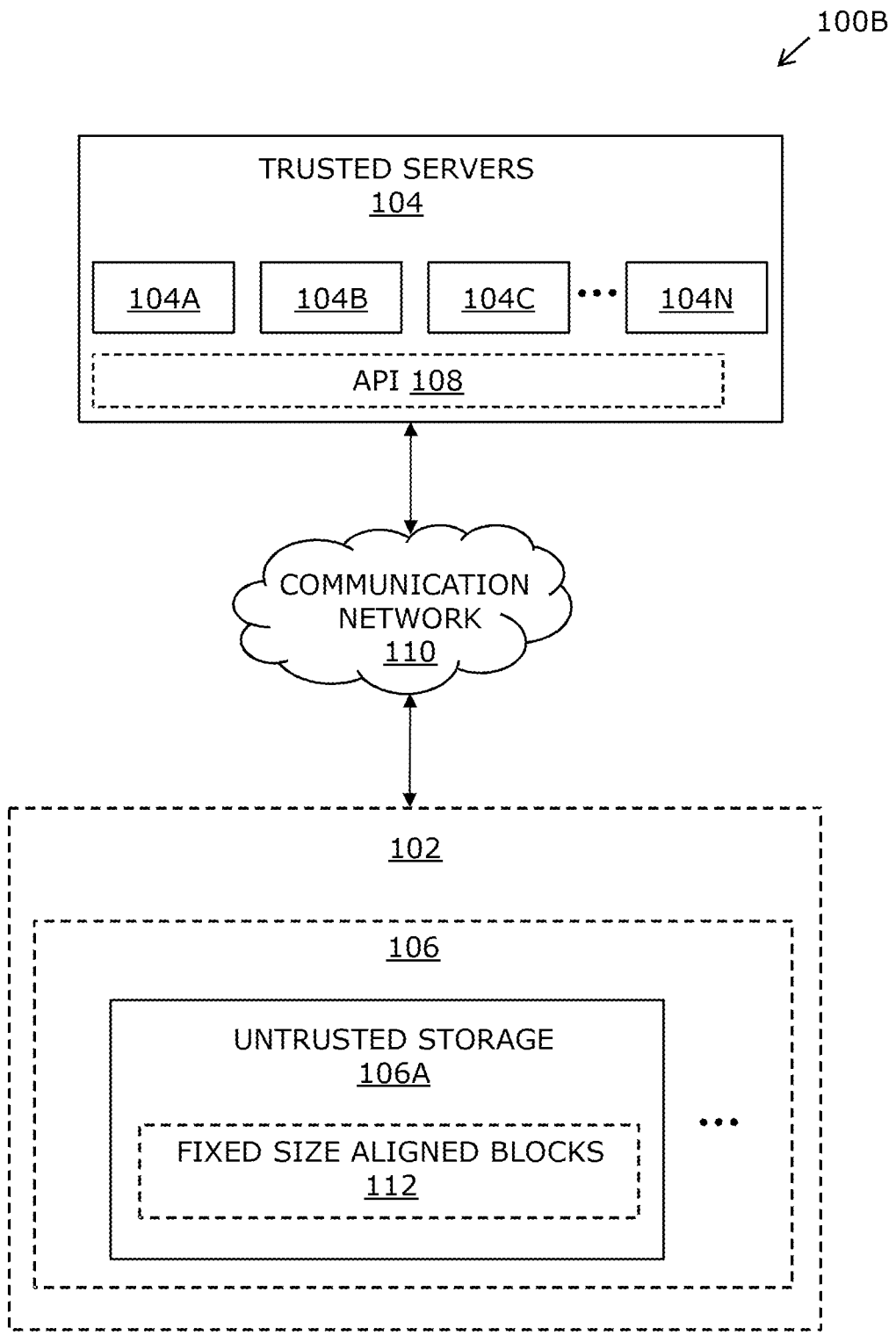
FIG. 1B is a network environment diagram of a system for a data deduplication and compression in an untrusted storage system, in accordance with an embodiment of the present disclosure.

FIG. 1B is a network environment diagram of a system for a data deduplication and compression in an untrusted storage system, in accordance with an embodiment of the present disclosure. With reference to FIG. 1B, there is shown a system 100B. The system 100B includes the untrusted storage 106A, the trusted servers 104, and the application program interface 108. The trusted servers 104 may be communicatively coupled to the untrusted storage 106A via the communication network 110. The trusted servers 104 include one or more sets of trusted servers, such as a first set of trusted servers (e.g. the servers 104A and 104B) and a second set of trusted servers (e.g. the servers 104C to 104N). The untrusted storage 106A includes fixed size aligned blocks 112. In an implementation, the untrusted storage 106A is one of the untrusted storages of the storage array 106 of the untrusted storage system 102.

In another aspect, the present disclosure provides the system 100B for a data deduplication and compression in an untrusted storage system, the system 100B comprises
  the untrusted storage 106A comprising fixed size aligned blocks 112;
  trusted servers 104 using an encryption key, wherein the trusted servers 104 are grouped to one or more sets of trusted servers based on the encryption key;
  the application program interface (API) 108 for executing a write function and a read function between the trusted servers 104 and the untrusted storage 106A, and wherein one or more trusted servers of the trusted servers 104 is configured to perform the data deduplication and compression to the untrusted storage system 102.

The untrusted storage 106A is one of the untrusted storages of the storage array 106 of the untrusted storage system 102. The untrusted storage 106A includes suitable logic, circuitry, interfaces, or code that is configured to store data (e.g. data associated with various software applications executed on the trusted servers 104) in the fixed size aligned blocks 112. In other words, untrusted storage 106A is a backup storage in which the trusted servers 104 can store data in the fixed size aligned blocks 112 for any defined duration. In an example, the untrusted storage 106A is a block device or an electronic device that employ a block device for data storage. In an example, the untrusted storage 106A is non-volatile mass storage device, such as a cloud-based storage media. It is to be understood that more than one untrusted storages may be used, for example, the storage array 106, of the untrusted storage system 102.

Each server of the one or more sets of trusted servers includes suitable logic, circuitry, interfaces, or code that is configured to store, process or transmit information to the untrusted storage 106A via the communication network 110. Examples of the servers include, but are not limited to a storage server, a cloud server, a web server, an application server, or a combination thereof. According to an embodiment, the server includes any arrangement of physical or virtual computational entities capable of enhancing information to perform various computational tasks. In an example, the servers may be a single hardware server. In another example, the servers may be a plurality of hardware servers operating in a parallel or distributed architecture. In an example, the server may include components such as memory, a processor, a network adapter and the like, to store, process or share information with other computing components, such as a user device. In an example, the server is implemented as a computer program that provides various services (such as database service) to other devices, modules or apparatus.

The application program interface 108 refers to a set of functions that can be called from an application program to access features of another program for executing functions such as read or write functions between the untrusted storage 106A and the trusted servers 104. In an implementation, the application program interface 108 is implemented in each of the trusted servers 104. In another implementation, the application program interface 108 may be implemented in the untrusted storage 106A (or each untrusted storage of the untrusted storage system 102. In an example, the application program interface 108 is a software interface that includes one or more routines, data structures, object classes, and protocols that support the interaction of the trusted servers 104 and one or more untrusted storages, such as the untrusted storage 106A.

The communication network 110 includes a medium (e.g. a communication channel) through which the trusted servers 104 communicate with the untrusted storage 106A. The communication network 110 may be a wired or wireless communication network. Examples of the communication network 110 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a Metropolitan Area Network (MAN), or the Internet. The untrusted storage 106A and the trusted servers 104 are potentially configured to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity(Li-Fi), or other cellular communication protocols or Bluetooth (BT) communication protocols, including variants thereof.

The system 100B comprises the untrusted storage 106A comprising the fixed size aligned blocks 112. The data is stored in form of blocks of data in the untrusted storage 106A. The fixed size herein refers to the amount of data (for example in chunks of defined size) that a block can store. The trusted servers 104 write data to the untrusted storage 106A, by separating (i.e. creating chunks of) the data into fixed size aligned blocks according to a storage block size for compression. The data is separated at a given trusted server (e.g. the server 104A) into blocks having fixed aligned size to enable improved storing and efficient retrieval of data from the untrusted storage 106A.

The system 100B further comprises trusted servers 104. The trusted servers 104 use the encryption key. The one or more set of trusted servers are grouped based on the encryption key. Each set of trusted servers is configured to use the encryption key for encrypting the data using an encryption algorithm for storing the data in an encrypted form in the untrusted storage 106A. The encryption key may be stored in a key manager associated with each of the servers of a given set of trusted servers. The trusted servers 104 further use hash functions for hashing the data that is to be stored in the untrusted storage 106A. For example, the first set of trusted servers (e.g. the servers 104A and 104B) may be configured to use a first encryption key and a first hash function.

The system 100B further comprises the application program interface 108 for executing a write function and a read function between the trusted servers 104 and the untrusted storage 106A, and wherein one or more trusted servers of the trusted servers 104 is configured to perform the data deduplication and compression to the untrusted storage system 102. The write function is executed to store the compressed encrypted data in the untrusted storage 106A in a way that the compressed encrypted data can be accessed only by a given set of trusted servers (e.g. trusted servers which share same encryption keys). The read function is executed to retrieve the stored compressed data from the untrusted storage 106A.

In accordance with an embodiment, in order to perform the data deduplication and compression, firstly, the one or more trusted servers of the trusted servers 104 is configured to define one or more sets of trusted servers, such as a first set of trusted servers (e.g. the servers 104A and 104B) and a second set of trusted servers (e.g. the servers 104C, . . . , 104N). Different sets of trusted servers are defined so that deduplication can be executed for trusted servers within one host group, so the data of one host group will not be overwritten by another host group during backup. Thereafter, one or more trusted servers of at least one set the trusted servers, such as the first set of trusted servers (e.g. the servers 104A and 104B) is further configured to separate the data in the trusted servers 104 into blocks having fixed aligned sizes according to a block size of the data in the untrusted storage system for compression. The data is separated into blocks having fixed aligned size to enable improved storing and efficient retrieval of data from the untrusted storage system 102. Beneficially, the separating of the data into blocks also enables improved indexing of the data in the untrusted storage 106A (and thus the entire untrusted storage system 102).

In accordance with an embodiment, the one or more trusted servers of the trusted servers 104 (e.g. one or more trusted servers of the first set of trusted servers) is further configured to calculate a hash value of the data. The hash value of the data is calculated using the hashing function. Hash values enable comparison between two blocks of data without actually comparing between the data of the two blocks of data.

In accordance with an embodiment, the one or more trusted servers of the trusted servers 104 (e.g. one or more trusted servers of the first set of trusted servers) is further configured to compress the data of each block. The data of each block is compressed to reduce a storage space occupied by the data when stored in the untrusted storage 106A. As a result, the untrusted storage 106A can store a larger amount of data in comparison to storing uncompressed data.

In accordance with an embodiment, the one or more trusted servers of the trusted servers 104 (e.g. one or more trusted servers of the first set of trusted servers) are further configured to encrypt the compressed data by using the encryption key. The compressed data is encrypted to prevent undesired access of the compressed data by any unauthorized users, servers, or third-party entities.

According to an embodiment, the application program interface 108 is further configured to use the hash value and the key ID at the untrusted storage 106A to identify whether the same hash value already exists in the untrusted storage 106A for a given set of trusted servers (e.g. the first set of trusted servers). During the execution of the write function, the hash value and the key ID received from the trusted servers 104 is compared with the hash values and key IDs already stored in the untrusted storage 106A.

According to an embodiment, the application program interface 108 is further configured to identify whether the key ID of the encryption key has changed in order to execute the write function at untrusted storage 106A. The key ID of the encryption key is checked for a change upon determining that the hash value received by the write function already exists in the untrusted storage 106A. If the hash value does not exist, the untrusted storage 106A creates a new entry, and stores the compressed encrypted data with the hash value as an index for accessing the data.

According to an embodiment, if the key ID of the encryption key has not changed the system 100B is further configured to store from the write function, by the untrusted storage 106A, the pointer to the location of the data. In other words, if the hash value is already present in the storage array, the untrusted storage system 102 checks if the encryption key of the encryption did not change from last time. If the key ID of the encryption key did not change, the new data (i.e. the data received from the first set of trusted servers) will just point to the old data (i.e. the data that is already stored in the untrusted storage system 102) via the pointer.

According to an embodiment, if the key ID of the encryption has changed the system is further configured to replace at the untrusted storage 106A, the data encrypted with the encryption key with the data encrypted with the changed encryption key and update data of a key ID of the changed encryption key. In other words, if the hash value exists but the key ID was updated, the untrusted storage 106A is configured to update the data and the encryption key, and all the previous entries will point to the data encrypted with the new encryption key. The pointers to this data are based on the hash value and thus remain the same.

According to an embodiment, if the writes are not aligned to the block, a read function is performed before write so that the data is available for writing. In other words, the write of data is performed for a specified size (such as 8 Kilobytes), if the write is not aligned to the size of the block, the read function is first performed.

In accordance with an embodiment, for example, during recovery, the application program interface 108 is configured to execute the read function by decrypting (by the one or more trusted servers of the trusted servers 104) the data of each block with a key matching the key ID of the encryption key and decompressing the data. As the data is compressed and encrypted using the encryption key, the decryption of the data during execution of the read function requires matching the key ID of the encryption key to enable decryption of data using the encryption key. As a result, any unauthorized server cannot access the data without having the correct encryption key.

According to an embodiment, the application program interface 108 is further configured to verify that the decompressed data has a correct hash value. When data is read upon execution of the read function, the one or more trusted servers (e.g. the server 104A) via the application program interface 108 will decrypt each block of data with the key matching the key ID, then the one or more trusted servers (e.g. the server 104A) will decompress the data, and verify that the decompressed data indeed has the correct hash value, this allows the integrity of the data, which in turn help maintain accuracy during recovery when required.

Figure 2A:
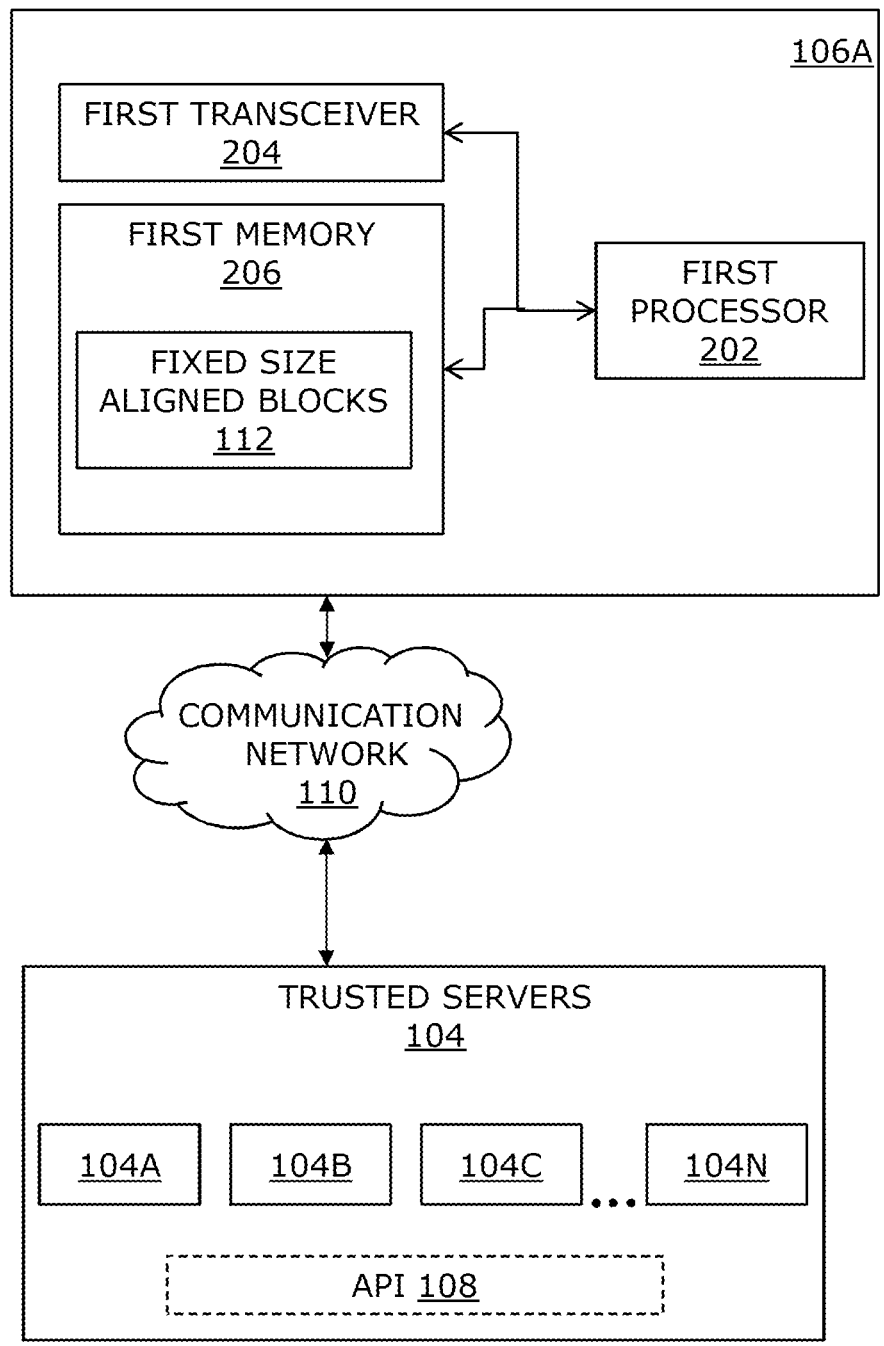
FIG. 2A is a block diagram that illustrates various exemplary components of an untrusted storage, in accordance with an embodiment of the present disclosure.

FIG. 2A is a block diagram that illustrates various exemplary components of an untrusted storage, in accordance with an embodiment of the present disclosure. With reference to FIG. 2A, there is shown the untrusted storage 106A. The untrusted storage 106A includes a first processor 202, a first transceiver 204, and a first memory 206. The first processor 202 may be communicatively coupled to the first transceiver 204 and the first memory 206. The untrusted storage 106A is coupled to the trusted servers 104 via the communication network 110.

The first processor 202 is configured to receive the data from the trusted servers 104. In an implementation, the first processor 202 is configured to execute instructions stored in the first memory 206. In an example, the first processor 202 may be a general-purpose processor. Other examples of the first processor 202 may include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or control circuitry. Moreover, the first processor 202 may refer to one or more individual processors, processing devices, a processing unit that is part of a machine, such as the untrusted storage 106A.

The first transceiver 204 includes suitable logic, circuitry, and interfaces that may be configured to communicate with one or more external devices, such as the trusted servers 104. Examples of the first transceiver 204 may include, but is not limited to, an antenna, a radio frequency (RF) transceiver, one or more amplifiers, one or more oscillators, a digital signal processor, a coder-decoder (CODEC) chipset, or a subscriber identity module (SIM) card.

The first memory 206 refers to a primary storage system of the untrusted storage 106A. The first memory 206 includes suitable logic, circuitry, and interfaces that may be configured to store the fixed size aligned blocks 112 and the instructions executable by the first processor 202. Examples of implementation of the first memory 206 may include, but are not limited to, Electrically Erasable Programmable Read-Only Memory (EEPROM), Random Access Memory (RAM), Read Only Memory (ROM), Hard Disk Drive (HDD), Flash memory, Solid-State Drive (SSD), or CPU cache memory. The first memory 206 may store an operating system or other program products (including one or more operation algorithms) to operate the untrusted storage 106A.

In operation, the first processor 202 of the untrusted storage 106A is configured to receive and store the encrypted and compressed data, a key ID of encryption key of the data before compression and a hash value of the data in the first memory 206 received from the trusted servers 104 at the time of execution of a write function by the trusted servers 104. The first processor 202 is further configured to provide the compressed data from the first memory 206 to trusted servers 104 at the time of execution of a read function.

Figure 2B:
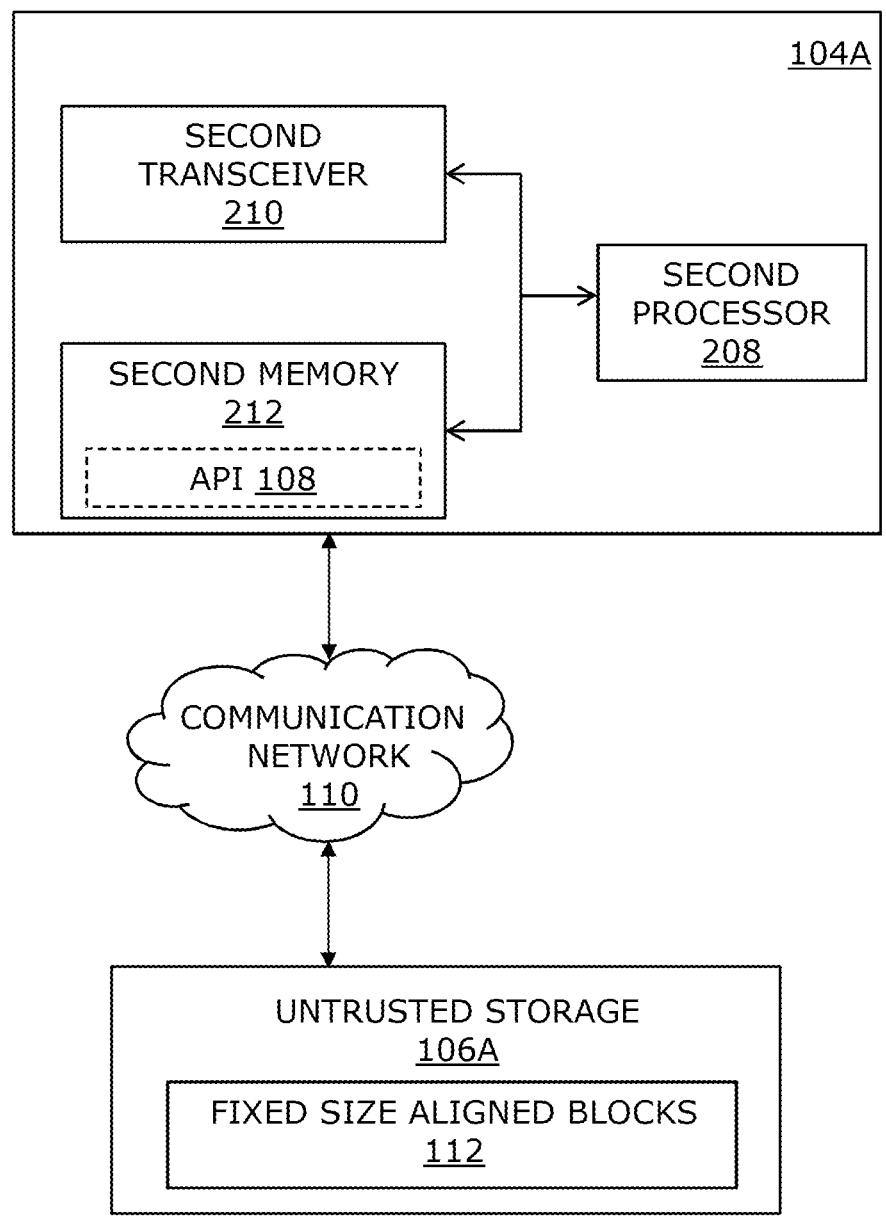
FIG. 2B is a block diagram that illustrates various exemplary components of a trusted server, in accordance with an embodiment of the present disclosure.

FIG. 2B is a block diagram that illustrates various exemplary components of a trusted server, in accordance with an embodiment of the present disclosure. With reference to FIG. 2B, there is shown a trusted server 104A of trusted servers 104. The trusted server 104A further includes a second processor 208, a second transceiver 210, and a second memory 212. The second processor 208 may be communicatively coupled to the second transceiver 210 and the second memory 212. The trusted server 104A is communicatively coupled to the untrusted storage 106A via the communication network 110.

The second processor 208 is configured to execute instructions stored in the second memory 212. In an implementation, the second processor 208 is configured to execute instructions stored in the second memory 212. In an example, the second processor 208 may be a general-purpose processor. Other examples of the second processor 208 may include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or control circuitry. Moreover, the second processor 208 may refer to one or more individual processors, processing devices, a processing unit that is part of a machine, such as the trusted server 104A.

The second transceiver 210 includes suitable logic, circuitry, and interfaces that may be configured to communicate with one or more external devices, such as the untrusted storage system 102. Examples of the second transceiver 210 may include, but is not limited to, an antenna, a radio frequency (RF) transceiver, one or more amplifiers, one or more oscillators, a digital signal processor, a coder-decoder (CODEC) chipset, or a subscriber identity module (SIM) card.

The second memory 212 refers to a primary storage system of the trusted server 104A. Examples of implementation of the second memory 212 may include, but are not limited to, Electrically Erasable Programmable Read-Only Memory (EEPROM), Random Access Memory (RAM), Read Only Memory (ROM), Hard Disk Drive (HDD), Flash memory, Solid-State Drive (SSD), or CPU cache memory. The second memory 212 may store an operating system or other program products (including one or more operation algorithms) to operate the trusted server 104A.

In operation, the second processor 208 of the trusted server 104A is configured to define one or more sets of trusted servers. The second processor 208 is further configured to separate the data to be stored in untrusted storage 106A into blocks having fixed aligned sizes according to a block size of the data in the untrusted storage 106A for compression. The second processor 208 is further configured to calculate a hash value of the data. The second processor 208 is further configured to compress the data of each block. The second processor 208 is further configured to encrypt the compressed data by using an encryption key. The second processor 208 is further configured to enable executing a write function via the application program interface 108 by sending a key ID of the encryption key and the hash value to the untrusted storage 106A (or to the storage array 106). The second processor 208 is further configured to enable executing a read function via the application program interface 108 by decrypting the data of each block with a key matching the key ID of the encryption key and decompressing the data.

Figure 3:
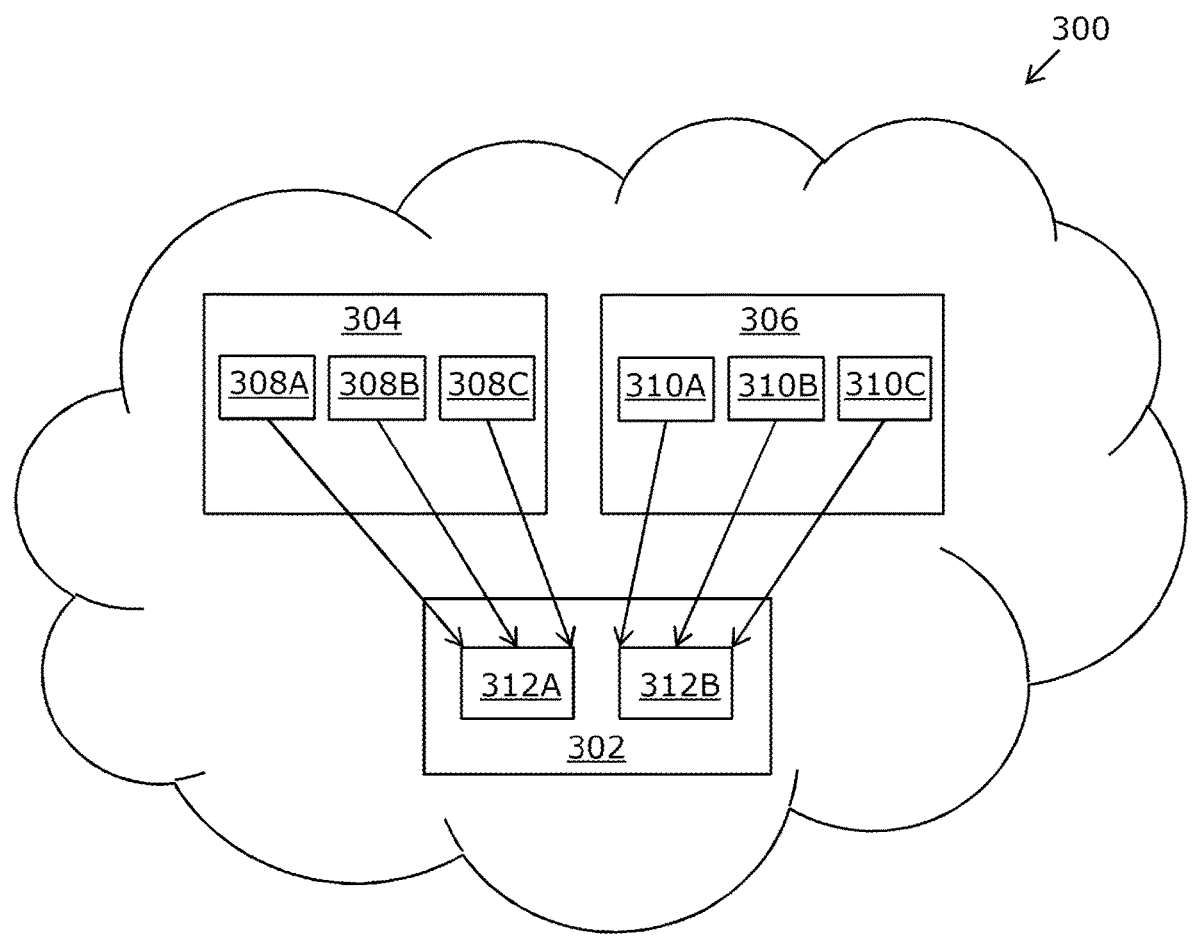
FIG. 3 is an illustration of an exemplary scenario of implementation of a system for a data deduplication and compression in an untrusted storage system, in accordance with another embodiment of the present disclosure.

FIG. 3 is an illustration of an exemplary scenario of implementation of a system for a data deduplication and compression in an untrusted storage system, in accordance with another embodiment of the present disclosure. With reference to FIG. 3, there is shown a system 300. The system 300 includes an untrusted storage 302, a first set of trusted servers 304, and a second set of trusted servers 306. The first set of trusted servers 304 include trusted servers 308A, 308B, and 308C. The second set of trusted servers 306 include servers 310A, 310B and 310C.

The first set of trusted servers 304 may also be referred to as a first server zone and the second set of trusted servers 306 may also be referred to as a second server zone. Servers of each respective set of trusted servers trust each other and use the same encryption keys and the same hash functions. As a result, servers of each set of trusted servers can have data deduplicated between its servers.

The untrusted storage 302 includes a first deduplication zone 312A to store data received from the first set of trusted servers 304 and a second deduplication zone 312B to store data received from the second set of trusted servers 306.

Data deduplication will only be for servers within the respective set of trusted servers, so the data of one set of the trusted server will not be overwritten by another. This is assured by having a different hash function for each set of trusted servers (i.e. the hashes can be encryption key specific to the set of servers that does not change).

The first set of trusted servers 304 and the second set of trusted servers 306 do not trust each other and thus data is not deduplicated between the first set of trusted servers 304 and the second set of trusted servers 306. The first set of trusted servers 304 and the second set of trusted servers 306 can also not read each other's data because they do not share the encryption keys.

Each of the first set of trusted servers 304 and the second set of trusted servers 306 executes a write function to store compressed and encrypted data along with respective key ID and hash values in the untrusted storage 302. Further, each of the first set of trusted servers 304 and the second set of trusted servers 306 is configured to retrieve the compressed and encrypted data by executing the read function.

Beneficially, the system 300 enables deduplication for the data that is stored as compressed data without the need of any mutual trust between the first set of trusted servers 304 and the untrusted storage 302 in comparison to conventional technologies where deduplication is only possible for compressed data when there is mutual trust between the servers and a storage system.

Figure 4:
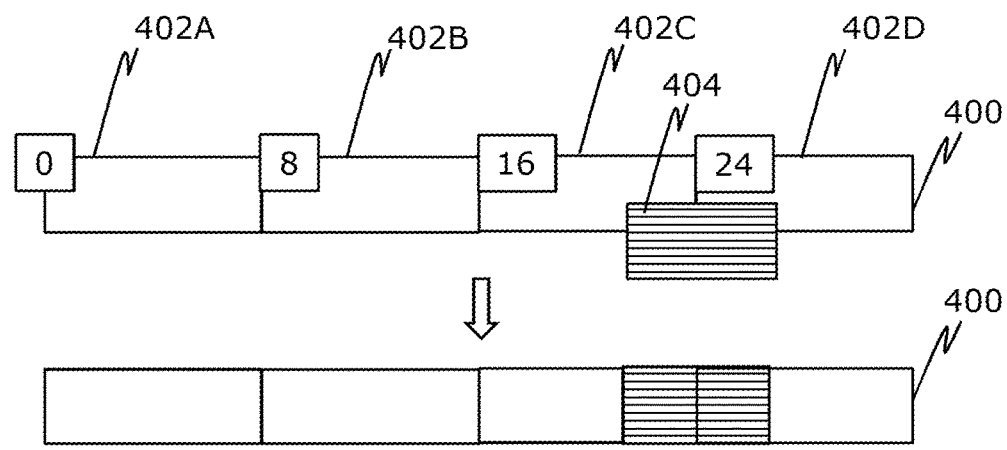
FIG. 4 is an illustration of an untrusted storage used for a data deduplication and compression in an untrusted storage system, in accordance with another embodiment of the present disclosure.

FIG. 4 is an illustration of an untrusted storage used for a data deduplication and compression in an untrusted storage system, in accordance with another embodiment of the present disclosure. With reference to FIG. 4, there is shown the untrusted storage 400. The untrusted storage 400 includes blocks 402A, 402B, 402C, 402D to store data.

The size of each block 402A, 402B, 402C, 402D is 8 Kilobytes. The data that is provided as inputs or received as outputs to the untrusted storage 400 is aligned to 8 Kilobytes offset and of size which is a multiple of 8 Kilobytes such as 24 Kilobytes, 40 Kilobytes, 128 Kilobytes and the like. In other words, the size of write must be a multiple of 8 Kilobytes for example writing 8 Kilobytes, 16 Kilobytes, 24 Kilobytes, 64 Kilobytes. When data 404 of size 4 Kilobytes is to be written to offset 18 Kilobytes, then an amount of 16 Kilobytes, is first read from the offset 16 Kilobytes. Further, 4 Kilobytes of data is replaced from offset 18 Kilobytes till 22 Kilobytes with the data 404, and then 16 Kilobytes is written to offset 16 Kilobytes.

The trusted servers 104 write the data 404 to the untrusted storage system by separating the data 404 into fixed size aligned blocks according to a storage block size for compression. The data 404 is separated at a given trusted server into blocks having fixed aligned size to enable improved storing and efficient retrieval of data from the untrusted storage system. Beneficially, the separating of the data 404 into blocks also enables improved indexing of the data 404 in the untrusted storage system.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the disclosure, which are, for brevity, described in the context of a single embodiment, may also be provided separately or in any suitable combination or as suitable in any other described embodiment of the disclosure.

What is claimed is:

1. A method for a data deduplication and compression in an untrusted storage system, wherein the method is applied to a system and the method comprises:
    defining a set of trusted servers, wherein each trusted server of the set of trusted servers is configured to use an encryption key and a hash function;
    separating data in the trusted servers into blocks having fixed aligned sizes according to a block size of data in the untrusted storage system for compression;
    determining a hash value of the data in the trusted servers;
    compressing the data of each block on a trusted server of the set of trusted servers;
    encrypting the compressed data by using the first encryption key;
    executing a write function via an application program interface (API), including
        identifying whether the hash value exists in a storage array for the set of untrusted servers based on the hash value and a key identification (ID) of the encryption key, and
        sending to a storage array of the untrusted storage system the compressed encrypted data, a key identification (ID) of the encryption key and the hash value from one or more trusted servers of the set of trusted servers based on the hash value not existing in the storage array of the untrusted storage system;
    executing a read function via the API by the trusted server decrypting the data of each block with a key matching the key ID of the first encryption key and decompressing the data; and
    identifying whether the key ID of the encryption key has changed, and
        (a) storing from the write function, by the untrusted storage system, a pointer to a location of the compressed data based on the key ID of the encryption key not having changed, and
        (b) updating, at the storage array of the untrusted storage system, the data encrypted with the encryption key the data of the key ID based on the key ID of the encryption having changed.

2. The method according to claim 1, wherein executing the read function further comprises: verifying that the decompressed data has a correct hash value.

3. A system for a data deduplication and compression in an untrusted storage system, the system comprises:
    an untrusted storage comprising fixed size aligned blocks;
    trusted servers using an encryption key, wherein the trusted servers are grouped to one or more sets of trusted servers based on the encryption key;
    an application program interface for executing a write function and a read function between the trusted servers and the untrusted storage; and
    one or more trusted servers of one of the one or more sets of trusted servers is configured to perform the data deduplication and compression to the untrusted storage system,
    wherein performing the data deduplication and compression comprises operations including:
    defining a set of trusted servers, wherein each trusted server of the set of trusted servers is configured to use an encryption key and a hash function;
    separating data in the trusted servers into blocks having fixed aligned sizes according to a block size of data in the untrusted storage system for compression;
    determining a hash value of the data in the trusted servers;
    compressing the data of each block on a trusted server of the set of trusted servers;
    encrypting the compressed data by using the encryption key;
    executing a write function via an application program interface (API), including
        identifying whether the hash value exists in a storage array for the set of untrusted servers based on the hash value and a key identification (ID) of the encryption key, and
        sending to a storage array of the untrusted storage system the compressed encrypted data, a key identification (ID) of the encryption key and the hash value from one or more trusted servers of the set of trusted servers based on the hash value not existing in the storage array of the untrusted storage system;
    executing a read function via the API by the trusted server decrypting the data of each block with a key matching the key ID of the encryption key and decompressing the data: and
    identifying whether the key ID of the encryption key has changed, and
        (a) storing from the write function, by the untrusted storage system, a pointer to a location of the compressed data based on the key ID of the encryption key not having changed, and
    (b) updating, at the storage array of the untrusted storage system, the data encrypted with the encryption key the data of the key ID based on the key ID of the encryption having changed.

4. The system according to claim 3, wherein executing the read function further comprises: verifying that the decompressed data has a correct hash value.

5. A non-transitory computer readable medium comprising: computer readable instructions for implementing an application programming interface for data deduplication and compression in an untrusted storage system, wherein the computer readable instructions when executed by a processor of a communication system, cause the communication system to carry out operations including:
    defining a set of trusted servers, wherein each trusted server of the set of trusted servers is configured to use an encryption key and a hash function;
    separating data in the trusted servers into blocks having fixed aligned sizes according to a block size of data in the untrusted storage system for compression;
    determining a hash value of the data in the trusted servers;
    compressing the data of each block on a trusted server of the set of trusted servers;
    encrypting the compressed data by using the encryption key;
    executing a write function via an application program interface (API), including
        identifying whether the hash value exists in a storage array for the set of untrusted servers based on the hash value and a key identification (ID) of the encryption key, and
        sending to a storage array of the untrusted storage system the compressed encrypted data, a key identification (ID) of the encryption key and the hash value from one or more trusted servers of the first set of trusted servers based on the hash value not existing in the storage array of the untrusted storage system;
    executing a read function via the API by the trusted server decrypting the data of each block with a key matching the key ID of the encryption key and decompressing the data: and
    identifying whether the key ID of the encryption key has changed, and
        (a) storing from the write function, by the untrusted storage system, a pointer to a location of the compressed data based on the key ID of the encryption key not having changed, and
        (b) updating, at the storage array of the untrusted storage system, the data encrypted with the encryption key the data of the key ID based on the key ID of the encryption having changed.

6. The non-transitory computer readable medium according to claim 5, wherein executing the read function further comprises: verifying that the decompressed data has a correct hash value.

* * * * *

UNITED STATES PATENT AND TRADEMARK OFFICE
CERTIFICATE OF CORRECTION

| | | |
|---|---|---|
| PATENT NO. | : 11,977,518 B2 | Page 1 of 1 |
| APPLICATION NO. | : 17/573376 | |
| DATED | : May 7, 2024 | |
| INVENTOR(S) | : Natanzon et al. | |

It is certified that error appears in the above-identified patent and that said Letters Patent is hereby corrected as shown below:

In the Claims

Claim 1, Column 19, Lines 58 and 59 reads as: "encrypting the compressed data by using the first encryption key;" should read as --encrypting the compressed data by using the t encryption key;--

Claim 1, Column 20, Lines 7 and 8 reads as: "the key ID of the first encryption key and decompressing the data; and" should reads as --the key ID of the encryption key and decompressing the data: and--

Claim 5, Column 22, Line 8: reads as "value from one or more trusted servers of the first set" should read as --value from one or more trusted servers of the set--

Signed and Sealed this
Fifteenth Day of April, 2025

Coke Morgan Stewart
*Acting Director of the United States Patent and Trademark Office*